Patented July 26, 1927.

1,636,688

UNITED STATES PATENT OFFICE.

PARLEY F. HARRIS, OF WASHINGTON, DISTRICT OF COLUMBIA.

COMPOSITION AND METHOD OF PREPARING ROACH TABLETS.

No Drawing.   Application filed August 3, 1926.  Serial No. 126,924.

The invention appertains to a composition designed to eradicate from buildings such insects as roaches and waterbugs.

It is recognized that some insects, such as roaches and waterbugs, propagate rapidly in urban localities where the buildings are heated during the winter months. For that reason considerable difficulty has been experienced in the eradication of such insects from dwellings, hotels, apartment houses, dairies and office buildings in urban districts, particularly where food and moisture may be found to sustain the insects.

In the effort to cope with insects of this class it has been customary to provide poisonous pastes or powders around infested places. These substances have merit, but are sometimes objectionable. The poisonous pastes may be eaten by children or household pets with injurious effect to them. The powders have a tendency to become distributed over surfaces not intended to be supplied therewith, and are objectionable because of the appearance thereof when used in sufficient quantities to accomplish the desired results.

The purpose of this invention is to provide a food-like substance deadly to insects, which may be easily handled and which is free from the objection urged against the use of paste and of powders.

The invention further resides in the method of preparing the substance into tablet form whereby the deleterious food may be safely, easily and cleanly shipped and stored and may be distributed with facility about places frequented by the insects.

While the invention is susceptible of various embodiments, and the proportions of the substances comprising the composition may be varied to meet special conditions, there will be described herein a combination of ingredients and a method of combining them in a manner which has been found particularly efficacious in the eradication of these insects from dwellings and public and business establishments.

The following substances with their approximate proportions may be used, it being understood that the proportions of the same may be substantially varied without departing from the scope of this invention:

| | Lbs. |
|---|---|
| Corn flour or meal, ground fine | 45 |
| Powdered sugar | 2 |
| Wheat flour | 15 |
| Boric acid | 22 |
| Sodium fluoride | 16 |
| Total | 100 |

In preparing the so-called food, the substances enumerated should be thoroughly mixed. Thereafter about ten per cent, of water may be slowly sprayed or poured into the composition while being thoroughly agitated. The moistened composition is then spread out or distributed in a thin layer over any suitable surface where it may be dried with heated air, preferably dehydrated air, of a temperature approximating 100° to 110° F., to crystallize the composition. When thoroughly dried the substance is cooled to atmospheric temperature and ground to a uniform consistency. Thereafter the ground substance is compressed into tablet form by any of the well-known methods.

Where the food tablets are to be promptly used, they may be uncoated and put about places frequented by the insects, such as in spaces adjacent weather boarding, near plumbing pipes, in cracks and crevices, and the like. The insect is attracted to the tablet by the food odors and eats the tablet for its food value. Thereafter the deleterious effect of the boric acid and the sodium fluoride will kill the insect.

It is found desirable to coat the tablet to retain its shape and prevent its disintegation from atmospheric conditions, and also during shipment and storage. Having in view the desirability of rendering the tablet soluble to the attack of insects, the coating is preferably of a readily soluble substance combined with a food-like substance. A thin film of any suitable coating material, such as paraffin, gelatine or gum arabic combined with a food-like substance is applied to the tablets by any of the well-known methods, such as dipping or spraying, and this coating substance preferably includes sugar or other sweetening substance such as sweetened chocolate.

While the tablets are not attractive as a food to household pets, their composition is such that they would not injure such pets if eaten. The so-called food is more economical in use as a tablet than when distributed as a powder.

Having described my improved composition, to the details of which description I of course do not limit myself, what I claim as my invention and desire to secure by Letters Patent is:

1. A roach and waterbug exterminator comprising a composition of substances deadly to insects consisting of boric acid and sodium fluoride, combined with bait substances, the whole being compressed into small, flat discs, suitable for placing in cracks, crevices and other places frequented by such insects.

2. The method of preparing a deleterious food for insects which consists in mixing a cereal flour and a sweetening substance with boric acid and sodium fluoride, adding moisture to the mass during agitation, distributing the moistened mass into a thin layer, heating the substance into crystallization, reducing the crystallized combination to powdered form, and compressing the same into tablet form.

3. The method of preparing a deleterious food for insects which consists in mixing a cereal flour and a sweetening substance with boric acid and sodium fluoride, adding moisture to the mass during agitation, distributing the moistented mass into a thin layer, heating the same into crystallization, reducing the crystallized combination to powdered form, and compressing the same into tablet form of a size suitable for insertion in cracks and crevices.

PARLEY F. HARRIS.